United States Patent [19]
Rehm et al.

[11] Patent Number: 6,144,181
[45] Date of Patent: Nov. 7, 2000

[54] METHOD AND APPARATUS FOR REDUCING RESONANCE IN A DUAL INERTIA SYSTEM

[75] Inventors: Thomas J. Rehm; Peter B. Schmidt, both of Franklin, Wis.

[73] Assignee: Rockwell Technologies, LLC, Thousand Oaks, Calif.

[21] Appl. No.: 09/158,184

[22] Filed: Sep. 21, 1998

[51] Int. Cl.[7] .................................................. G05B 11/01
[52] U.S. Cl. ........................................... 318/629; 318/609
[58] Field of Search ..................................... 318/569–572, 318/609, 610, 611, 616–620, 621, 624

[56] References Cited

U.S. PATENT DOCUMENTS

| | | | |
|---|---|---|---|
| 5,032,776 | 7/1991 | Garagnon | 318/611 |
| 5,220,262 | 6/1993 | Kneifel | 318/569 |
| 5,325,247 | 6/1994 | Ehrlich et al. | 360/78.09 |
| 5,369,345 | 11/1994 | Phan et al. | 318/561 |
| 5,400,269 | 3/1995 | White et al. | 364/570 |
| 5,642,461 | 6/1997 | Lewis | 388/812 |
| 5,854,877 | 12/1998 | Lewis | 388/812 |

*Primary Examiner*—Jonathan Salata
*Attorney, Agent, or Firm*—Michael A. Jaskolski; John J. Horn; William B. Walbrun

[57] ABSTRACT

A method and apparatus for minimizing resonant oscillations in a dual inertia system characterized by minimally stable poles and both a resonant frequency and an anti-resonant frequency, the apparatus including a notch filter which is tuned so that notch filter zeros essentially cancel the minimally stable poles and so that at least one notch pole is located at the intersection of a real axis and an system anti-resonant zero radius on a root-loci plot, thereby rendering an exceptionally stable system, the method for tuning the notch filter as described.

8 Claims, 3 Drawing Sheets

METHOD AND APPARATUS FOR REDUCING RESONANCE IN A DUAL INERTIA SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to notch filters and more specifically to a method and apparatus for tuning a notch filter to reduce torsional oscillations within a dual inertia system such as a motor and load which are mechanically linked.

For the purposes of this explanation, when referring to the drawings, an "m" subscript indicates a property or signal relating to a motor, an "l" subscript indicates a property or signal related to a load, an "n" subscript indicates a signal related to the notch filter, an "s" subscript indicates that a signal relates to a system, an "f" subscript denotes a feedback signal, an "*" denotes a command signal and an "e" subscript denotes an error signal.

Almost all motor/load systems exhibit some degree of oscillation between the motor and load when motor speed is modified or load characteristics are modified. For example, motor/load oscillation is common where a motor is coupled to a rolling mill drive, a paper machine or a machining center. Oscillations occur because of the elastic nature of couplings, gears and spindles along the drive train between the motor and linked load.

To control motor operation (e.g. speed, torque, response time, etc.), most motors are equipped with a controller which receives command signals and drives the motor and load as a function of the command signals. For example, often a velocity command signal is provided indicating a desired motor/load velocity. To maintain the desired velocity most controllers include a feedback loop which senses actual motor rotor velocity, compares the actual and command velocities and modifies command signals to eliminate any difference between the actual and command velocities.

When a torque is generated by the motor which is intended to change load position, for example, to increase rotational speed, the torque is transmitted via the drive train to the load. However, because load inertia resists speed change, as the rotor angle changes to increase load torque, the load lags the rotor and the difference between the rotor and load angle twists the drive train storing energy therein.

The rotor eventually reaches the command speed while the load still lags. Eventually the drive train distresses and imparts its stored energy to the load. This distressing can accelerate the load to a speed higher than the intended speed. The load in turn restresses the drive train in the opposite direction and provides a force to the rotor tending to further increase rotor speed to a speed which exceeds the command speed.

When the rotor speed exceeds the command speed, the feedback loop again generates an error signal. In response to the error signal the controller again modifies the command signal, this time to slow down the motor/load system. Again, when the motor speed changes the rotor leads the load and energy is stored in the twisting of the drive train. Upon distressing, the drive train again imparts a slinging force to the load thereby causing the load to undershoot the command speed. The load in turn restresses the drive train in the opposite direction providing a force to the rotor tending to decrease rotor speed to a speed which is less than the command speed.

If this pattern of twisting to store energy and distressing continues incessant motor/load oscillation can occur at what is commonly referred to as a resonant system frequency. In addition to stored stress within the drive train, another common source of motor/load oscillation is system gear backlash. Moreover, uncontrolled load disturbances, system parameter variations (e.g. resistance/inductance changes due to heating, etc.), actuator saturation and unmeasured states also contribute to oscillations.

In addition to causing unstable and poor control performance, oscillations in the mechanical drive train linkages can lead to metal fatigue and eventually disastrous effects in the system.

In an effort to reduce the effects of resonance in a dual energy system such as a motor/load, the industry has developed several different techniques. For example, some techniques utilize a lead-lag filter in the feedback velocity loop or in a feed-forward leg of the controller to dampen vibrations up to and around a maximum velocity loop bandwidth.

Referring to FIG. 1, exemplary motor and load velocity responses, $\omega_m$ and $\omega_l$, respectively, to a step input command signal $\omega^*$ provided to a typical controller/motor configuration wherein the controller includes a lead/lag filter is illustrated. The lead portion of the lead-lag filter is designed to improve the rise time of responses $\omega_m$ and $\omega_l$, at the expense of a higher natural frequency while the lag portion of the lead-lag filter is designed to improve response overshoot and relative stability at the expense of a longer risetime.

In FIG. 1, at time t1 when command velocity signal $\omega^*$ is stepped, motor velocity response $\omega_l$ instantaneously increases and load response $\omega_m$ lags slightly behind. A short time after time t1, response $\omega_m$ is high and therefore the lag filter decreases motor velocity. A short time thereafter, response $\omega_m$ is low to improve overshoot and therefore the lead filter increases motor velocity. Each time response $\omega_m$ changes from lead to lag or vice versa, response $\omega_l$ lags there behind. The overall result using the lead-lag filter is less overshoot, faster rise time and better overall stability.

Lead-lag filters not only damp at the resonant frequency but also damp at other frequencies which, for optimal system response, should not be damped.

Other systems employ a notch filter instead of a lead-lag filter for minimizing oscillation and improving overall system response. To this end, it has been recognized in the controls art that many systems, including dual inertia systems, have transfer functions which contain a pair of complex-conjugate system poles. The system poles often make it extremely difficult to control these systems, especially if the poles are very close to the imaginary axis of a root-loci s-plane, as is the case in a dual inertia system. In effect, the system poles in a dual inertia system cause instability which in turn results in undesired oscillation.

The notch filter has a transfer function which includes notch zeros and poles. Notch zeros are chosen such that they essentially cancel system poles. In addition, notch poles are chosen to be more stable than the original system poles. Specifically, the notch transfer function is typically chosen such that the notch poles are identical and real with a damping term R which is equal to 2.0 (see Equation 1 below). It has been known for a long time that by selecting factor R=2.0, a system response which is acceptable for most applications occurs.

Referring to FIG. 2, a load velocity response $\omega_l'$ to a step input command signal $\omega^*$ at time t1 using a system including a notch filter is illustrated. Comparing response $\omega_l$ from FIG. 1 to response $\omega_l'$ from FIG. 2, clearly response $\omega_l'$ using the notch filter is better than the response $\omega_l$ using a lead-lag filter. Nevertheless, high frequency oscillation still occurs in response $\omega_l'$ which, for some applications, is unacceptable.

Another technique to damp load resonance is to measure load velocity and provide a load velocity feedback loop for comparison to the reference speed signal. Unfortunately load velocity and/or load position signals (which could be used to determine load velocity) are usually not available for measurement. While a load velocity sensor could be provided, because many different sensor configurations would likely have to be accommodated such a versatile system would be relatively expensive.

Instead of a versatile sensor an observer mechanism could be provided to estimate load velocity and a damping loop could be closed around the observer signal. While such a system would be feasible, observer systems are not practical as they require a large amount of system information during configuration. Required information usually includes information about system dynamics, system structure and system parameters, some of which is difficult to determine.

As each of the previous solutions to minimizing oscillation between the components of a dual inertia system has one or more shortcomings, it would be advantageous to have a system which could essentially eliminate oscillation between the components of a dual inertia system which is easy and relatively inexpensive to implement.

BRIEF SUMMARY OF THE INVENTION

According to the present invention a notch filter is provided in a forward control path and the notch filter is uniquely tuned to essentially eliminate system oscillation in a dual inertia system. This is accomplished by deriving a simplified second order system transfer function, selecting notch filter transfer function zeros to cancel relatively unstable system poles, and selecting notch poles so that both notch poles are on the real axis of a root-loci s-plane and one of the poles is on the real axis at a radius which is equal to the magnitude of the system zeros. It has been found that by selecting the notch poles in such a manner an exceptionally stable system results.

A transfer function in the Laplace domain for a notch filter can be expressed as:

$$H(s) = \frac{s^2 + \frac{\omega_n}{A}s + \omega_n^2}{s^2 + R\omega_n s + \omega_n^2} \quad \text{Eq. 1}$$

where $\omega_n$ is a natural frequency, A is a tuning variable chosen by a user and R is a damping term.

A simplified transfer function which accurately models most dual inertia systems can be expressed in the Laplace domain as:

$$\frac{\omega_m}{t_m} = \frac{\frac{1}{J_m}\left(s^2 + \frac{\kappa}{J_l}\right)}{\left(s^2 + \frac{\kappa(J_m + J_l)}{J_m J_l}\right)s} \quad \text{Eq. 2}$$

where $\omega_m$ is a motor frequency, $J_m$ is a motor inertia, $J_l$ is a load inertia, k is a spring constant and $t_m$ is motor torque. According to Equation 2, there are three imaginary poles:

$$p_{s1} = +\sqrt{\frac{\kappa(J_m + J_l)}{J_m J_l}}\, i \quad \text{Eq. 3}$$

$$p_{s2} = -\sqrt{\frac{\kappa(J_m + J_l)}{J_m J_l}}\, i \quad \text{Eq. 4}$$

$$p_{s3} = 0 \quad \text{Eq. 5}$$

where $i = \sqrt{-1}$.

A resonant frequency $\omega_r$ for the system transfer function of Equation 2 is determined by equating the denominator of Equation 2 to the standard second order characteristic equation $s^2+2\zeta\omega_n s+\omega_n^2$ and assuming a very small or zero damping term $\zeta$ to yield:

$$\omega_r = \sqrt{\frac{\kappa(J_m + J_l)}{J_m J_l}} \; \frac{\text{rad}}{\text{sec}} \quad \text{Eq. 6}$$

An anti-resonant frequency $\omega_{ar}$ for the system transfer function of Equation 2 is determined by equating the numerator of Equation 2 to the standard second order equation and assuming a small or zero damping term $\zeta$ to yield:

$$\omega_{ar} = \sqrt{\kappa \frac{1}{J_l}} \; \frac{\text{rad}}{\text{sec}} \quad \text{Eq. 7}$$

According to the present invention, once the resonant and anti-resonant frequencies $\omega_r$ and $\omega_{ar}$, respectively, are identified, filter transfer function values (see Equation 1) $\omega_n$, A and R are tuned such that notch transfer function zeros (i.e. roots) essentially cancel unstable resonant system poles. To cancel system poles natural frequency $\omega_n$ is chosen to be equal to resonant frequency $\omega_r$.

Notch poles are then chosen so as to be positioned in a more stable location. Importantly, according to the present invention, term R is chosen to be a function of the ratio between the anti-resonant frequency $\omega_{ar}$ and the resonant frequency $\omega_r$ such that:

$$R = \frac{\omega_{ar}}{\omega_r} + \frac{\omega_r}{\omega_{ar}} \quad \text{Eq. 8}$$

When term R is so chosen the notch poles fall on the real root-loci axis, one notch pole at a radius equal to the magnitude of the anti-resonance zeros (i.e. at $\omega_{ar}$) and a second notch pole on the real axis at a radius equal to $\omega_r^2/\omega_{ar}$. Tuning the notch filter in this manner has been found to provide an exceptionally stable system.

To determine the resonant and anti-resonant frequencies and hence facilitate notch filter tuning, the invention also contemplates a system which performs a Fast Fourier Transform of a velocity error signal. This is explained in more detail below.

Thus, one object of the present invention is to provide a simple system for minimizing oscillation in a dual inertia system. To this end, a simple notch filter is placed within a forward control path and a precise protocol for tuning filter values is provided so that there is no ambiguity with respect to desired filter values. The inventive system reduces system oscillation more than conventionally tuned notch filters.

Another object is to achieve the aforementioned object without requiring a large amount of additional hardware and inexpensively. To this end, no additional sensors or feedback loops are required. In addition, once a filter is tuned for a system, unless system parameters are modified, no additional tuning or calculating is required. If, however, system parameters are modified, the filter can easily be retuned to reflect a new configuration.

Generally the invention includes an apparatus which is characterized as described above and in more detail below, a method for tuning a notch filter as described above and in more detail below and a method for providing a notch filter which is tunes as indicated above.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION a. Theory

Figure 3:
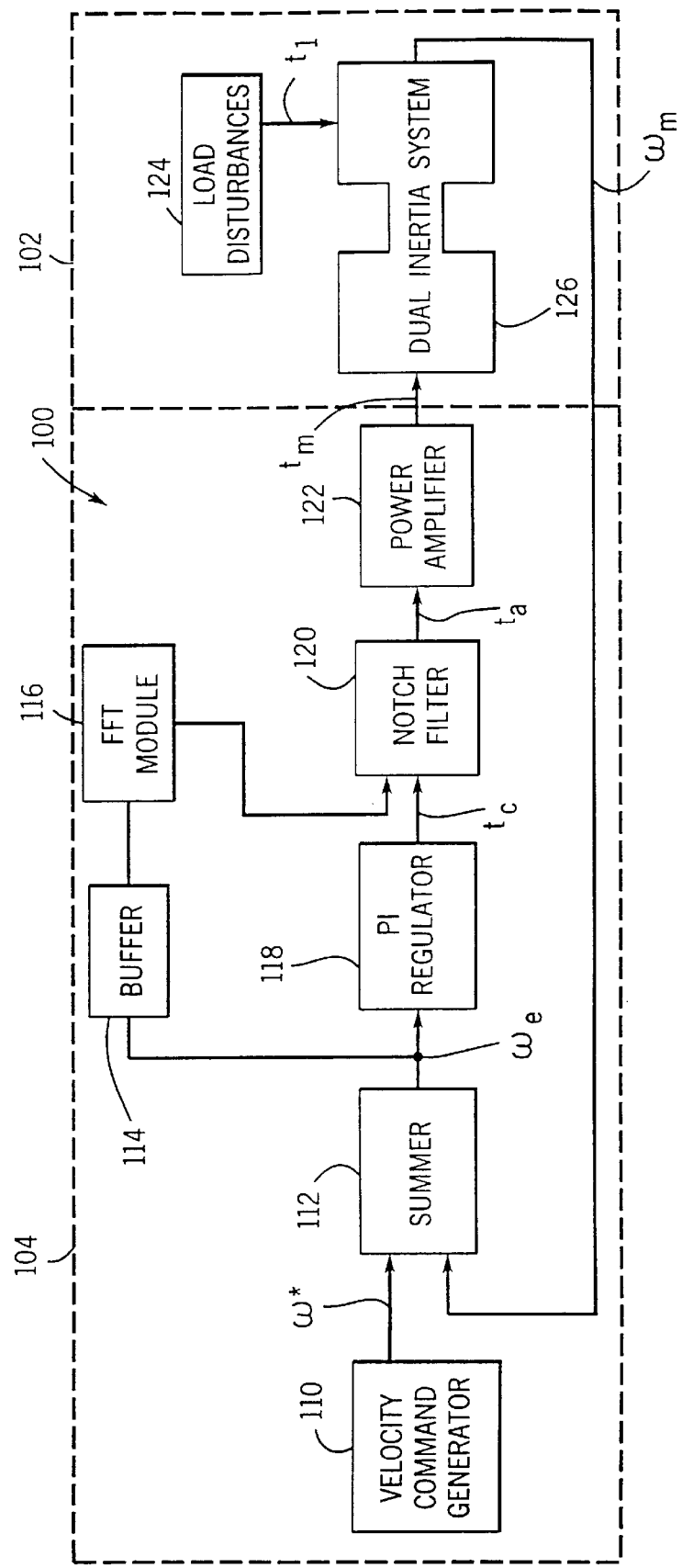
FIG. 3 is a schematic diagram illustrating a controller and load system according to the present invention.

Referring now to the drawings and specifically to FIG. 3, the invention will be described in the context of a system configuration 100 which includes a controller 104 and a plant 102. Controller 104 includes a velocity command generator 110, a summer 112, a data buffer 114, a Fast Fourier Transfer (FFT) module 116, a proportional-integral (PI) regulator 118, a notch filter 120 which is tuned according to the present invention and a power amplifier 122.

Command generator 110 provides a command velocity signal $\omega^*$ which indicates a desired motor and system velocity and which is received by summer 112. Summer 112 receives both command velocity signal $\omega^*$ and a motor velocity signal $\omega_m$ and subtracts motor velocity signal $\omega_m$ from command velocity signal $\omega^*$ to yield a velocity error signal $\omega_e$ which is provided to both buffer 114 and regulator 118. Buffer 114 and FFT module 116 cooperate during a commissioning procedure to determine a resonant frequency $\omega_r$ for plant 102. Antiresonant frequency $\omega_{ar}$ is determined from known system parameters and during an auto-tuning step of a drive commissioning procedure which is explained in more detail below. Frequencies $\omega_r$ and $\omega_{ar}$ are provided to tune filter 120 according to the present invention. Regulator 118 generates a torque or current command signal $t_c$ thereby providing a signal $t_c$ to filter 120.

Filter 120 performs two tasks. First, filter 120 adjusts a filter transfer function based on the values of the resonant frequency $\omega_r$ and anti-resonant frequency $\omega_{ar}$. Second, filter 120 multiplies the torque command $t_c$ by the adjusted transfer function to yield an adjusted torque $t_a$. Adjusted torque $t_a$ is provided to power amplifier 122. Amplifier 122 steps up adjusted torque $t_a$ thereby providing a motor torque $t_m$ to plant 102.

Plant 102 includes both a source of load disturbances 124 and a dual inertia system 126. Disturbance source 124 represents load changes which occur during plant operation which provide a load torque $t_l$ to system 126.

Figure 4:
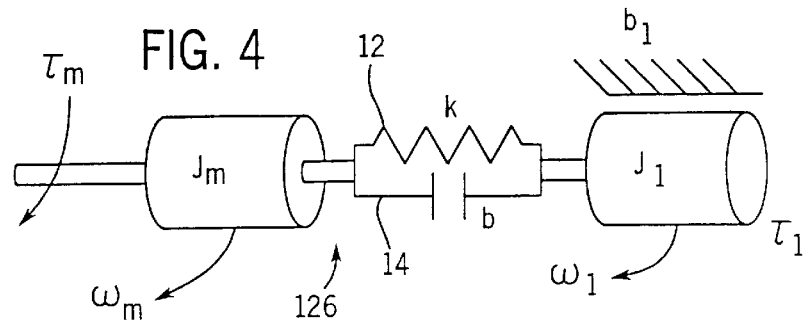
FIG. 4 is a schematic representation of the dual inertia system of FIG. 3.

Referring to FIGS. 3 and 4, system 126 can be modeled as a motor inertia $J_m$ coupled to a load inertia $J_l$ by an elastic shaft 12 and a damper 14. Shaft 12 is modeled as a spring characterized by a spring constant k while damper 14 is characterized by a damping term b. A motor torque $t_m$, is applied to motor inertia $J_m$ resulting in a motor velocity $\omega_m$ while a load torque or disturbance $t_l$, is applied to load inertia $J_l$ affecting a load velocity $\omega_l$. Most physical systems have some sort of mechanical damping or friction present in the form of bearings, gear friction, or windage. Therefore, an additional damping term $b_l$ may act on load inertia $J_l$.

Motor velocity $\omega_m$ and load velocity $\omega_l$ may be different because of the flexible shaft coupling represented by constant k which results in resonant torsional oscillations. The magnitudes and the frequency of torsional oscillations in system 126 are a function of the magnitudes of inertias $J_m$ and $J_l$, the stiffness of shaft 12 and the magnitudes of damping terms b and $b_l$.

In most cases damping term b between motor inertia $J_m$ and load inertia $J_l$ is relatively small and therefore can be neglected when mathematically modeling system 126. For the purposes of the present explanation damping term b is ignored.

Figure 5:
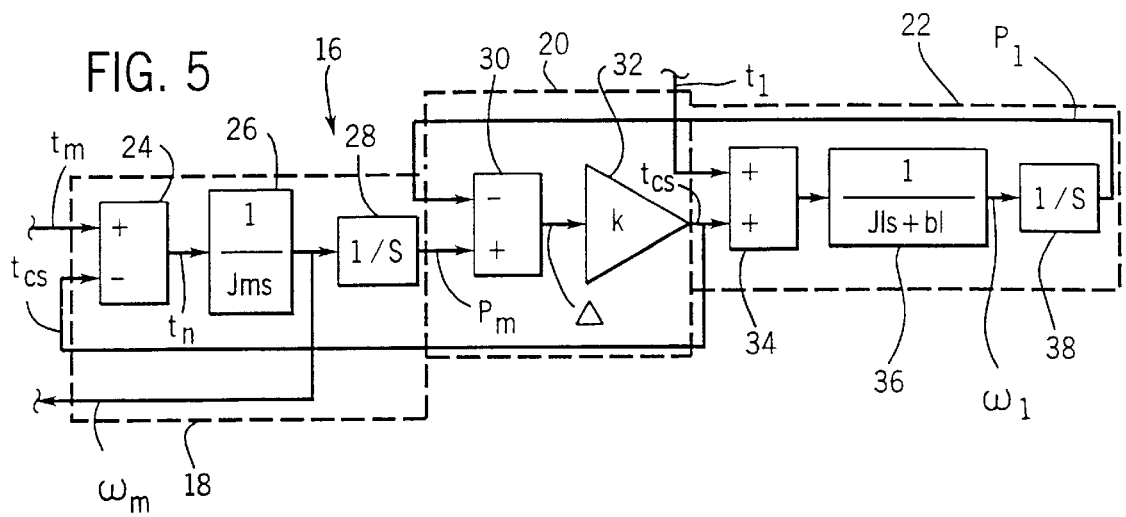
FIG. 5 is a block diagram modeling the system of FIG. 4.

Dual inertia systems like the one illustrated in FIG. 4 can be modeled in many different ways. Referring to FIGS. 4 and 5, one model 16 which is helpful in formulating a mathematical transfer function for system 126 is illustrated. Model 16 includes three sections, a motor section 18, a spring or shaft section 20 and a load section 22. Motor section 18 includes a first summer 24, a motor model element 26 and a first integrator 28.

Summer 24 receives each of motor torque signal $t_m$ (from controller 104) and a coupling spring torque signal $t_{cs}$ and subtracts spring torque signal $t_{cs}$ from signal $t_m$ yielding a net torque $t_n$ which is provided to motor element 26. Element 26 models an exemplary motor inertia $J_m$ and uses net torque $t_n$ to generate motor velocity signal $\omega_m$ which is provided to integrator 28 and is also provided to summer 112 (see FIG. 3). Integrator 28 integrates signal $\omega_m$ and provides a motor position signal $p_m$ to spring section 20.

Spring section 20 includes a second summer 30 and a spring constant gain 32. In addition to receiving motor position signal $p_m$ form integrator 28, summer 30 also receives a load position signal $p_l$ from load section 22. Summer 30 subtracts load position signal $p_l$ from motor position signal $p_m$ providing the difference $\Delta$ to gain 32. Gain 32 multiplies constant k by difference $\Delta$ and provides its output as applied torque $t_{cs}$ to load section 22 as well as to first summer 24.

Load section 22 includes a third summer 34, a load model element 36 which models a load and a second integrator 38. Third summer 34 receives both applied torque signal $t_{cs}$ and load torque signal $t_l$ and adds the two torque signals providing its output to element 36. Element 36 in turn generates a load velocity signal $\omega_l$ which is provided to integrator 38. Integrator 38 integrates the load velocity signal $\omega_l$ thereby generating load position signal $p_l$ which is provided to second summer 30.

Referring to FIGS. 4 and analyzing model 16 a transfer function can be formulated which characterizes system 126. The resulting transfer function is:

$$\frac{\omega_m}{t_m} = \frac{J_l s^2 + b_l s + \kappa}{J_m J_l s^3 + J_m b_l s^2 + (J_m + J_l)\kappa s + b_l \kappa} \quad \text{Eq. 9}$$

Typically, it can be assumed that load damping term $b_l$ is relatively small compared to spring constant k (i.e. $b_l \ll k$). Therefore, assuming term $b_l$ is zero, Equation 9 can be simplified to yield:

$$\frac{\omega_m}{t_m} = \frac{\frac{1}{J_m}\left(s^2 + \frac{\kappa}{J_l}\right)}{\left(s^2 + \frac{\kappa(J_m + J_l)}{J_m J_l}\right)s} \quad \text{Eq. 10}$$

Equation 10 clearly includes three poles $p_{s1}$, $p_{s2}$ and $p_{s3}$ (a separate pole corresponding to each of the s terms in the denominator) and two zeros (i.e. roots) $z_{s1}$ and $z_{s2}$ (a separate zero corresponding to each s term in the numerator). Poles $p_{s1}$, $p_{s2}$ and $p_{s3}$ are identified by Equations 3, 4 and 5 above, with poles $p_{s1}$ and $p_{s2}$ being imaginary. The system zeros are also imaginary and are:

$$z_{s1} = +\sqrt{k\frac{1}{J_l}} i \quad \text{Eq. 11}$$

$$z_{s2} = -\sqrt{\kappa\frac{1}{J_l}} i \quad \text{Eq. 12}$$

where $i = \sqrt{-1}$.

Figure 6:
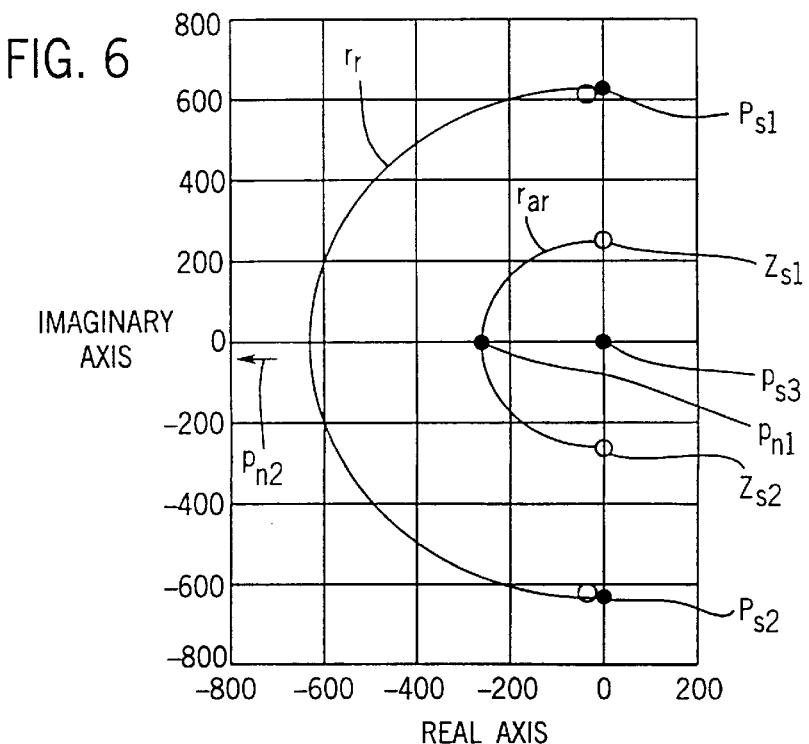
FIG. 6 is a root-loci plot illustrating system and notch poles and zeros.

Referring also to FIG. 6, poles $p_{s1}$, $p_{s2}$ and $p_{s3}$ and zeros $z_{s1}$ and $z_{s2}$ are illustrated on a conventional root-loci plot with real and imaginary axis. In addition, a plant resonant pole radius $r_r$ and a plant anti-resonant zero radius $r_{ar}$ which correspond to poles $p_{s1}$, $p_{s2}$ and zeros $z_{s1}$, $z_{s2}$, respectively, are illustrated.

As well known in the controls art, when system poles are in the right half plane (RHP) of a root-loci plot, an associated system is unstable and when poles are in the left half plane (LHP), in time, the system will reach a stable steady state. When a pole is on the imaginary axis which divides the LHP and the RHP, the system is marginally stable but, theoretically, will never reach a single steady state (i.e. resonant oscillation occurs). On the other hand, when system poles are on the real axis and in the LHP a steady state is achieved relatively quickly.

Referring again to FIG. 6, in addition to being on the imaginary axis, pole $p_{s3}$ is on the real axis and therefore pole $p_{s3}$ is stable. However, poles $p_{s1}$ and $p_{s2}$ are only on the imaginary axis and therefore cause a marginally stable system. For this reason poles $p_{s1}$ and $p_{s2}$ cause resonant oscillations in system 126.

Referring also to FIG. 3, filter 120 is provided to stabilize system 126 by essentially eliminating resonant oscillation. To this end, filter 120 is characterized by the standard second order transfer function:

$$H(s) = \frac{s^2 + \frac{\omega_n}{A}s + \omega_n^2}{s^2 + R\omega_n s + \omega_n^2} \quad \text{Eq. 13}$$

where $\omega_n$ is a filter natural frequency, R is a damping term and A is an adjustable variable. The process of tuning filter 120 such that system 126 oscillations are essentially eliminated involves two tuning objectives. The first objective involves selecting natural frequency $\omega_n$ and value a such that resulting notch zeros $z_{n1}$ and $z_{n2}$ essentially cancel unstable system poles $p_{s1}$ and $p_{s2}$. The second objective involves selecting extremely stable notch poles $p_{n1}$ and $p_{n2}$ which cause system 126 to have advantageous operating characteristics.

The first objective is achieved by a two step process. First, assuming a relatively large variable A so that the second term in the numerator of Equation 15 is insignificant, natural frequency $\omega_n$ is selected such that notch transfer function zeros $z_{n1}$ and $z_{n2}$ cancel system poles $p_{s1}$ and $p_{s2}$. In other words, the filter transfer function must be tuned such that notch zeros $z_{n1}$ and $z_{n2}$ are equal to system poles $p_{s1}$ and $p_{s2}$. This is accomplished by setting natural frequency $\omega_n$ equal to the resonant system frequency $\omega_r$. Is:

$$\omega_r = \sqrt{\frac{\kappa(J_m + J_l)}{J_m J_l}} \frac{\text{rad}}{\text{sec}} \quad \text{Eq. 14}$$

Second, variable A is set to a value (e.g. A=1000) which causes notch zeros $z_{n1}$ and $z_{n2}$ to be slightly in the LHP to compensate for inaccuracies due to assumptions made when deriving the simplified transfer function of Equation 12. In theory, when damping terms b and $b_l$ are essentially zero and natural frequency $\omega_n$ is chosen so that it equals resonant frequency $\omega_r$, notch zeros $z_{n1}$ and $z_{n2}$ cancel system poles $p_{s1}$ and $p_{s2}$. However, while it is advantageous to assume essentially zero value damping terms b and $b_l$ when developing the system transfer function of Equation 12, damping terms b and $b_l$ do in fact have a slight effect on the placement of poles $p_{s1}$ and $p_{s2}$, tending to push poles $p_{s1}$ and $p_{s2}$ slightly into the LHP. By choosing value A properly, notch zeros $z_{n1}$ and $z_{n2}$ are scewed slightly into the LHP and more accurately align with and cancel poles $p_{s1}$ and $p_{s2}$.

Figure 1:
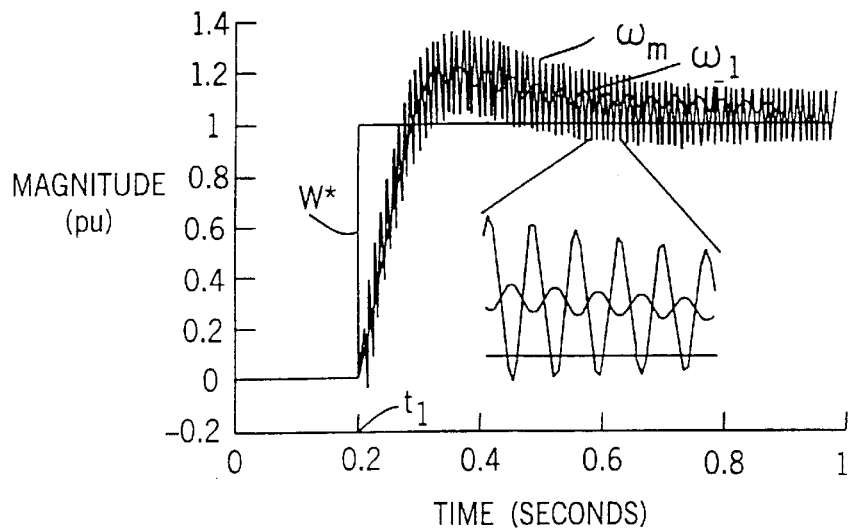
FIG. 1 is a graph illustrating a step velocity command signal, a motor velocity response signal and a load velocity response signal associated with a lead/lag filter type controller.
Figure 2:
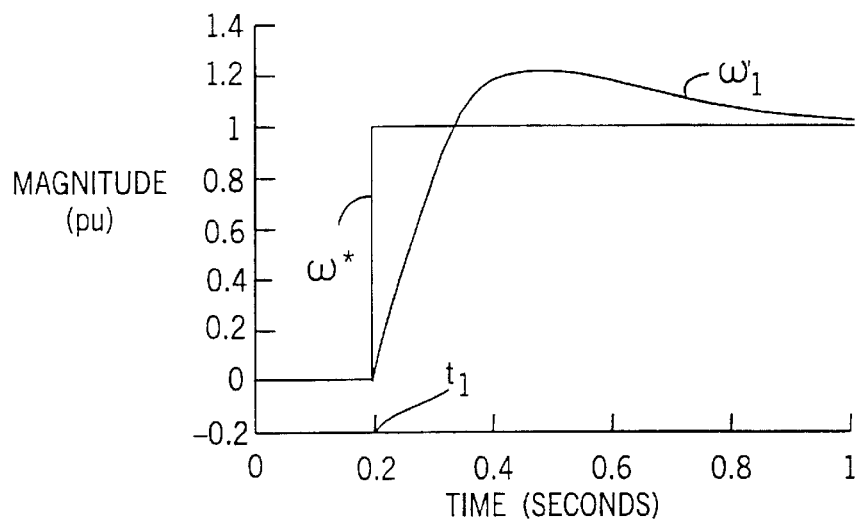
FIG. 2 is similar to FIG. 1, albeit illustrating waveforms associated with a conventionally tuned notch filter type controller.

The second objective, selecting damping term R such that resulting notch poles $p_{n1}$ and $p_{n2}$ are highly stable, is achieved as follows. Typical notch filters have been designed with an R value of 2.0. When term R is 2.0, exemplary velocity response $\omega_1$ to step command signal $\omega$ is illustrated in FIG. 2. Importantly, the present inventors have recognized that by selecting a damping term R which is greater than 2.0, oscillation can be appreciably minimized. More specifically, it has been recognized that by selecting a damping term R which places one of the notch poles $p_{n1}$ on the plant anti-resonant zero radius $r_{ar}$ (see FIG. 6), a highly stable system results.

To place notch pole $p_{n1}$ on anti-resonant radius $r_{ar}$ damping term R is selected to be:

$$R = \frac{\omega_{ar}}{\omega_r} + \frac{\omega_r}{\omega_{ar}} \qquad \text{Eq. 15}$$

When term R is so chosen, notch poles $p_{n1}$ and $p_{n2}$ are on the real axis at:

$$p_{n1} = \omega_{ar} \qquad \text{Eq. 16}$$

$$p_{n2} = \frac{\omega_r^2}{\omega_{ar}} \qquad \text{Eq. 17}$$

Notch poles $p_{n1}$ and $p_{n2}$ are illustrated in FIG. 6 where it can be seen that pole $p_{n1}$ is on anti-resonant radius $r_{ar}$.

B. Determining Resonant and Anti-Resonant Frequencies

Referring again to FIG. 3, buffer 114 and FFT module 116 cooperate to determine resonant frequency $\omega_r$. To this end, buffer 114 samples velocity error signal $\omega_e$ and provides error signals to module 116. Module 116 uses error signals $\omega_e$ to determine resonant frequency $\omega_r$ by performing an FFT on received data. Note that velocity error signal $\omega_e$ is used to determine resonant frequency $\omega_r$ instead of using the velocity command or motor velocity signals, $\omega^*$, $\omega_m$, respectively, as the command signal $\omega^*$ and actual signal $\omega_m$ typically contain a DC offset or ramp signal which complicates the task of identifying resonant frequency $\omega_r$.

Typically motor inertia $J_m$ will be a name plate value. In addition, load inertia $J_l$ can usually be calculated during a commissioning procedure in any of several different manners which are well known in the art. One method is to determine a total system inertia $J_t$ which comprises both the motor inertia $J_m$ and the load inertia $J_l$ and then subtract the motor inertia $J_m$ from the total inertia to identify the load inertia. For the purposes of this explanation it will be assumed that load inertia $J_l$ is provided as a name plate value for the load. Both inertias $J_m$ and $J_l$ are provided to FFT module 116.

After frequency $\omega_r$ has been identified, module 116 plugs inertias $J_m$ and $J_l$ and resonant frequency $\omega_r$ into Equation 6 to determine spring constant k. Thereafter, module 116 plugs load inertia $J_l$ and spring constant k into Equation 7 to determine anti-resonant frequency $\omega_{ar}$. Both frequencies $\omega_r$ and $\omega_{ar}$ are provided to notch filter 120.

As indicated above, filter 120 uses frequencies $\omega_r$ and $\omega_{ar}$ to tune notch transfer function (see Equation 15) to cancel system poles $p_{s1}$ and $p_{s2}$, place a first notch pole $p_{n1}$ at the intersection of a root-loci real axis and the plant anti-resonant radius $r_{ar}$ and place a second notch pole $p_{n2}$ on the real axis at.

$$\frac{\omega_r^2}{\omega_{ar}}.$$

C. Results

Figure 7:
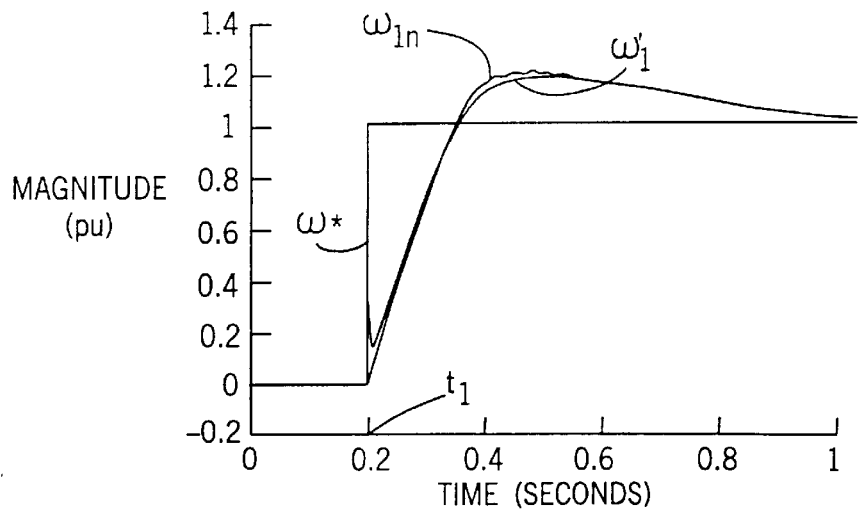
FIG. 7 is a graph illustrating the same curves as FIG. 2 and an additional curve which corresponds to a load velocity response to a step input signal which results from a system including a controller having a notch filter tuned according to the present invention.

Referring now to FIG. 7, two waveforms including a step input command signal $\omega^*$ and a load velocity response signal $\omega_{ln}$ which results when the system of FIG. 3 is tuned according to the present invention are illustrated. In addition the load velocity response signal $\omega_l'$ from FIG. 2 where damping term R was set at 2.0 is provided for easy comparison between response signals $\omega_{ln}$ and $\omega_l'$. As can be seen, using the present method for tuning term R essentially all ripple in response signal $\omega_l'$ is eliminated indicating less system 126 oscillation.

It should be understood that the methods and apparatuses described above are only exemplary and do not limit the scope of the invention, and that various modifications could be made by those skilled in the art that would fall under the scope of the invention. For example, many different values for variable A may be chosen, some values which are more suitable than others, depending on how far into the LHP the system poles extend. In addition, while the invention is described in the context of a controller which includes a notch filter in a feed-forward control path, the invention also contemplates systems wherein a notch filter tuned according to the present invention is placed in a feedback control path. Moreover, while the invention is described above in the context of an apparatus, clearly the invention includes a method for tuning a notch filter so that notch zeros cancel system poles, notch poles are relatively stable and one of the notch poles is on the real axis at a radius which is equal to the magnitude of the system zeros.

To apprise the public of the scope of this invention, we make the following claims:

What is claimed is:

1. A method for use in a configuration including a controller and a dual energy system, the system including a drive component and a load component, the controller controlling the drive component and the drive component driving the load component, the system characterized generally by a second order transfer function including two system resonant poles and two system zeros and having a resonant frequency $\omega_r$ and an anti-resonant frequency $\omega_{ar}$, the method for minimizing resonance, the method comprising the steps of:

providing a notch filter characterized by a Laplace domain transfer function:

$$H(s) = \frac{s^2 + \frac{\omega_n}{A}s + \omega_n^2}{s^2 + R\omega_n s + \omega_n^2}$$

where A is a tuning variable, R is a damping term and $\omega_n$ is a natural frequency; and tuning the transfer function such that natural frequency $\omega_n$ is equal to resonant frequency $\omega_r$ and a damping term $R=(\omega_{ar}/\omega_r)+(\omega_r/\omega_{ar})$.

2. The method of claim 1 further including the steps of, prior to providing, determining both the system resonant frequency $\omega_r$ and the system anti-resonant frequency $\omega_{ar}$.

3. The method of claim 2 wherein the step of determining the system resonant frequency includes the steps of determining a motor velocity error signal indicating the difference between a commanded motor velocity and an actual motor velocity and performing a Fast Fourier Transfer on the error signal to determine the system resonant frequency.

4. The method of claim 3 wherein the motor and load components are linked together via a shaft and the shaft is characterized by a spring constant k, the motor is characterized by a motor inertia $J_m$ and the load is characterized by a load inertia $J_l$, each of the load and motor inertias $J_l$ and $J_m$ are known and the step of determining the anti-resonant frequency $\omega_{ar}$ includes solving the equation:

$$\omega_r = \sqrt{K\frac{(J_m + J_l)}{J_m J_l}}$$

to determine the value of constant k and then solving the equation:

$$\omega_{ar} = \sqrt{\kappa \frac{1}{J_l}} \frac{\text{rad}}{\text{sec}}.$$

5. A method for use in a configuration including a controller, a dual energy system and a notch filter, the system including a drive component and a load component, the controller controlling the drive component and the drive component driving the load component, the system characterized generally by a second order transfer function including two system resonant poles and two system zeros and having a resonant frequency $T_r$ and an anti-resonant frequency $T_{ar}$, the notch filter characterized by a second order transfer function also having two poles and two zeros, the method for minimizing resonance and comprising the steps of:

selecting notch filter transfer function zeros to cancel the system resonant poles wherein the notch filter transfer function in the Laplace domain is $$H(s) = \frac{s^2 + \frac{\omega_n}{A} + \omega_n^2}{s^2 + R\omega_n s + \omega_n^2}$$

where A is a tuning variable, R is a damping term and $\omega_n$ is a natural frequency; and selecting notch filter poles so that both notch filter poles are on the real axis of a root-loci s-plane and one of the poles is on the real axis at a radius which is equal to the magnitude of the system zeros, the step of selecting notch filter poles including the step of tuning the notch filter such that natural frequency $\omega_n$ is equal to resonant frequency $\omega_r$ and damping term $R=(T_{ar}/T_r)+(T_r/T_{ar})$.

6. The method of claim 5 further including the steps of, prior to selecting the notch filter zeros, determining both the system resonant frequency $\omega_r$ and the system anti-resonant frequency $\omega_{ar}$.

7. The method of claim 6 wherein the drive component is a motor and the method further includes the steps of determining a motor velocity error signal indicating the difference between a commanded motor velocity and an actual motor velocity and performs a Fast Fourier Transfer on the error signal to determine the system resonant frequency.

8. The method of claim 7 wherein the motor and load components are linked together via a shaft and the shaft is characterized by a spring constant k, the motor is characterized by a motor inertia $J_m$ and the load is characterized by a load inertia $J_l$, each of the load and motor inertias $J_l$ and $J_m$ are known and the step of determining the anti-resonant frequency $\omega_{ar}$ includes solving the equation:

$$\omega_r = \sqrt{\kappa \frac{(J_m + J_l)}{J_m J_l}}$$

to determine the value of constant k and then solving the equation:

$$\omega_{ar} = \sqrt{\kappa \frac{1}{J_l}} \frac{\text{rad}}{\text{sec}}.$$

* * * * *